United States Patent Office 3,131,200
Patented Apr. 28, 1964

3,131,200
C-RING HALOGENATED PROGESTERONES
Hans Reimann, Bloomfield, and David H. Gould, Leonia,
N.J., assignors to Schering Corporation, Bloomfield,
N.J., a corporation of New Jersey
No Drawing. Filed June 1, 1959, Ser. No. 817,054
24 Claims. (Cl. 260—397.3)

This invention relates to novel and therapeutically useful halogenated steroids and to methods for their manufacture. In particular, this invention relates to 6,17-disubstituted-9α,11β-dihalogenated derivatives of progesterone which exhibit valuable progestational properties.

Our novel compounds may be represented by the following formula:

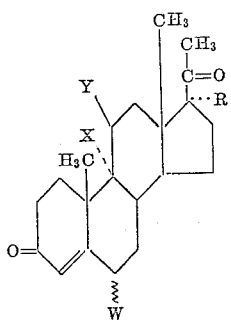

wherein X is a halogen having an atomic weight greater than 19; Y is a halogen having an atomic weight less than 126 and being at least as electronegative as X; R is a member of the group consisting of bromine, hydroxy and acyloxy; W is fluorine; the 1-dehydro and 19-nor analogs thereof. The wavy line denoted as "⌇" in the above formula indicates that the substituent at the 6-carbon may be in either an α or β-position. These novel compounds are thus 6,9,11,17-tetrahalogenated analogs, 17-acyloxy-6,9,11-trihalogenated analogs of progesterone, 1-dehydroprogesterone and 19-norprogesterone.

Illustrative of the 17α-acyl groups in the 17α-acyloxy derivatives contemplated by our invention are lower alkanoates such as formate, acetate, propionate, butyrate, isobutyrate, valerate, isovalerate, pivalate, caproate, enanthate; substituted alkanoates such as β-cyclopentylpropionate, cyclohexylacetate, ethoxyacetate, phenylacetate, phenoxyacetate; unsaturated acyl radicals such as acrylate and crotonate, aromatic acyl radicals such as benzoate and toluate, as well as the residues of dibasic acids such as succinate and phthalate and of fatty acids such as undecanoate and laurate. The term "acyloxy" thus includes acyl radicals of monocarboxylic and dicarboxylic acids containing up to 12 carbon atoms.

In the above formula, the halogen at C-11 must be at least as electronegative as the halogen present in the 9α-position (fluorine being the most electronegative halogen, and iodine the least electronegative) and further cannot be iodo. Thus, a progesterone of our invention containing a 9α-chloro group may possess an 11β-chloro or an 11β-fluoro group, but cannot contain an 11β-iodo or 11β-bromo group. This artificial restriction as to the electronegativity of the 9- and 11-substituents is necessarily imposed in view of the limitations of the manufacturing process developed below.

Typical progesterones embraced by the general formula are the 6-fluoro-9α,11β-dichloro-17α-acetoxyprogesterones (i.e. both the 6α- and 6β-isomers of 6-fluoro-9α,11β-dichloro-17α-hydroxyprogesterone 17-acetate), 6-fluoro-9α,11β - dichloro-17α-hydroxy-progesterones, 6α-11β-difluoro - 9α - bromo-17α-acetoxyprogesterone, 6β,11β-difluoro-9α-iodo-17α-acetoxyprogesterone, 6α - fluoro-9α,17α-dibromo-11β-chloroprogesterone, as well as 1-dehydro analogs such as 6α-fluoro-9α,11β-dichloro-17α-acetoxy-1,4-pregnadiene-3,20-dione; and 19-nor analogs such as the 6 - fluoro-9α,11β-dichloro-17α-acetoxy-19-norprogesterones. Although our compounds (except the 17-hydroxy substituted compounds which are valuable as intermediates) are, in general, valuable progestins, the 6α-substituted - 9α,11β - dihalogeno - 17α - acyloxyprogesterones of the general formula are the preferred species and, in particular, 6α - fluoro - 9α,11β-dichloro-17α-hydroxyprogesterone 17-acetate.

Our novel compounds are prepared by reacting a 4,9(11)-pregnadiene-3,20-dione substituted at the 6-carbon by fluorine and at the 17-carbon by acyloxy, or halogen (or a similarly substituted 1,4,9(11)-pregnatriene-3,20-dione) with a suitable halogenating agent. The starting compounds utilized in this invention are therefore exemplified by compounds such as 6-fluoro-17α-acetoxy-4,9(11)-pregnadiene-3,20-diones, 6α-fluoro-17α-bromo - 4,9(11) - pregnadiene-3,20-dione, the 1-dehydro analogs of the foregoing as well as 19-nor-4,9(11)-pregnadienes such as 6α-fluoro-17α-acetoxy-4,9(11)-19-norpregnadiene-3,20-dione and 6β-fluoro-17α-acetoxy-4,9-(11)-19-norpregnadiene-3,20-dione. The starting materials thus necessarily possess a $\Delta^{9,11}$-bond, and are prepared by a combination of processes analogous to those described in the literature. For example, 6α-fluoro-17α-hydroxy - 4,9(11) - pregnadiene-3,20-dione 17-acetate is prepared from 6α-fluoro-11β,17α-dihydroxyprogesterone by initial dehydration as effected by reagents such as methanesulfonyl chloride in the presence of pyridine or phosphorus oxychloride in pyridine to yield 6α-fluoro-17α-hydroxy-4,9(11) - pregnadiene - 3,20 - dione. Upon subsequent esterification of the 17α-hydroxypregnadiene thus obtained according to known techniques such as with acetic acid in the presence of trifluoroacetic anhydride or a suitable acid anhydride (such as acetic) in the presence of an acidic catalyst such as p-toluene-sulfonic acid there is obtained 6α-fluoro-17α-hydroxy-4,9-(11)-pregnadiene-3,20-dione 17-acetate. By substituting other lower alkanoic acids such as β-cyclopentylpropionic and caproic for acetic acid in the above esterification procedures, other 17α-lower alkanoate starting compounds are obtained such as the 17α-(β-cyclopentylpropionate) and 17α-caproate respectively of 6α-fluoro-17α-hydroxy-4,9(11)-pregnadiene-3,20-dione.

When an intermediate containing an 11-hydroxy group is not available the hydroxyl group is introduced microbiologically into an 11-desoxy analog such as 6β-fluoro-17α-hydroxyprogesterone 17-acetate with the aid of a microorganism such as Curvularia lunata (N.R.R.L. 2380) by procedures analogous to those described in U.S. Patent No. 2,658,023. The 6β-fluoro-11β,17α-dihydroxyprogesterone 17-acetate thus produced upon treatment with a dehydrating agent such as previously described yields 6β - fluoro - 17α - hydroxy-4,9(11)-pregnadiene-3,20-dione 17-acetate (6β - fluoro-17α-hydroxy-9-(11)-dehydroprogesterone 17-acetate). Other requisite 9(11)-dehydro starting compounds obtained in this manner are the 6α and 6β-isomeric analogs of 6-fluoro-17α-hydroxy-4,9(11)-19-norpregnadiene-3,20-dione prepared from 6α-fluoro-17α-hydroxy-19-norprogesterone 17-acetate and 6β - fluoro-17α-hydroxy-19-norprogesterone 17-acetate, respectively.

Our 9(11)-dehydro starting compounds may also be prepared by introducing an 11α-hydroxyl group into a 6,17-disubstituted-11-desoxy progesterone through the action of a microorganism such as Rhizopus nigricans (A.T.C.C. 6227b) using procedures analogous to those described in U.S. Patent No. 2,602,769. Subsequent treatment of the 11α-hydroxyprogesterone derivative so obtained with a sulfonyl chloride such as methanesulfonyl chloride or toluenesulfonyl chloride yields the corresponding 11α-sulfonate which when treated with a base such as pyridine gives the desired 6,17-disubstituted-9(11)-dehydroprogesterone derivative.

To obtain 6,17α-disubstituted-9(11)-dehydroprogesterones from a 17α-substituted progesterone such as 17α-bromoprogesterone, known chemical techniques are employed. Typically 17α-bromoprogesterone, is treated with ethylene glycol by known procedures to form the 3,20-bisethylene ketal derivative which, in turn, is expoxidized on treatment with, for example, monoperphthalic acid to give 5α,6α-epoxy-17α-bromopregnane-3,20-dione 3,20-bisethylene ketal. From this epoxy intermediate the 6-fluoro-substituent is introduced into the pregnane nucleus. Thus, the action of hydrofluoric acid on the epoxy bisethylene ketal intermediate simultaneously hydrolyzes the bisethylene ketal groups and opens the epoxy ring yielding 5α-hydroxy-6β-fluoro-17α-bromopregnane-3,20-dione. A reagent such as ethanolic hydrochloric acid on this 5α-hydroxy-6β-substituted-17α-bromopregnane simultaneously dehydrates the hydroxy group and epimerizes the 6β-constituent to yield 6α-fluoro-17α-bromoprogesterone. In order to obtain a 6-substituent in the β-position, the 5α-hydroxy-6β-substituted pregnane intermediates are treated with, for example, thionyl chloride in a cold basic medium such as pyridine to give 6β-fluoro-17α-bromoprogesterone. The 6α-substituted progesterones may also be prepared from the corresponding 6β-substituted isomers by means of alcoholic solutions of acids or bases such as ethanolic hydrogen chloride and ethanolic potassium hydroxide. The 6-substituted-17α-bromoprogesterones obtained in the above manner are 11-hydroxylated and dehydrated as heretofore described to give 6α-fluoro-17α-bromo-4,9(11)-pregnadiene-3,20-dione (6α-fluoro-17α-bromo-9(11)-dehydroprogesterone), and 6β-fluoro-17α-bromo-4,9(11)-pregnadiene-3,20-dione (6β-fluoro-17α-bromo-9(11)-dehydroprogesterone).

The 1-dehydro intermediates such as the 6α-fluoro-, and 6β-fluoro-derivatives of 17α-bromo-1,4,9(11)-pregnatriene-3,20-dione (i.e. 6α-fluoro-17α-bromo-1,9(11)-bisdehydroprogesterone, and 6β-fluoro-17α-bromo-1,9(11)-bisdehydroprogesterone, respectively); the 6α-fluoro-, and 6β-fluoro derivatives of 17α-hydroxy-1,4,9(11)-pregnatriene-3,20-dione 17-acetate, 6α-fluoro-17α-acetoxy-1,9(11)-bisdehydroprogesterone, and 6β-fluoro-17α-acetoxy-1,9(11)-bisdehydroprogesterone, respectively) and the 6α-fluoro-derivatives of 17α-bromo-1,4,9(11)-pregnatriene-3,20 dione (i.e. 6α-fluoro-17α-bromo-1,9(11)-bisdehydroprogesterone) are prepared from the corresponding 6-fluoro derivatives of 17α-bromo-9(11)-dehydroprogesterone and 17α-acyloxy-9(11)-dehydroprogesterone by microbiological dehydrogenation with an organism such as, for example, Corynebacterium simplex (A.T.C.C. 6946) in a manner similar to that described in U.S. Patent No. 2,837,464, or by chemical dehydrogenation through the use of such reagents as chloranil or selenium dioxide.

Halogenating agents suitable for use in our process are:

(1) Molecular halogens having a molecular weight greater than 38 and less than 253. This class includes heteroatomic halogen molecules such as iodine monochloride as well as isoatomic halogen molecules such as chlorine and bromine. The molecular halogen employed may be used alone or in admixture with a halide anion. In reactions employing isoatomic molecular halogens, an anion corresponding to the molecular halogen is used. For example, in reactions using molecular chlorine, a suitable chloride salt such as lithium chloride or hydrochloric acid are suitable anion sources. In reactions which employ a heteroatomic molecular halogen, a source of the more electronegative anion is used, i.e. a suitable chloride salt or hydrochloric acid is used in a reaction employing iodine monochloride.

(2) Addition compounds of molecular halogens, said molecular halogens having a molecular weight greater than 38 and less than 253. Examples of such addition compounds are pyridinium bromide perbromide, pyridinium chloride perchloride, dioxane dibromide, iodobenzene dichloride and the like.

(3) N-haloamides in admixture with a halide anion, the halogen in the halide being at least as electronegative as the halogen cation in the N-haloamide, and the combined molecular weight of said halogens being greater than 38 and less than 253. N-haloamides used in these mixtures are such as N-chlorosuccinimide, N-bromoacetamide, dimethyl-N,N-dibromohydantoin, N-iodosuccinimide and the like. Examples of mixtures of N-haloamide and a halide are such as N-chlorosuccinimide and hydrogen chloride; N-bromoacetamide and hydrogen bromide; N-bromoacetamide and lithium chloride; N-bromoacetamide and hydrogen fluoride; N-iodosuccinimide and sodium chloride. These mixtures may have more than one source of halide ion such as in the reagent combination N-chlorosuccinimide, hydrogen chloride and lithium chloride.

Molecular halogens (both isoatomic and heteroatomic) such as chlorine, bromine and iodine monochloride, and molecular halogen addition compounds such as iodobenzene dichloride or pyridinium bromide perbromide employed in our process may be used directly in their commercially available form, in which case they are added directly to the reaction mixture either alone or in a suitable non-reacting solvent such as acetic acid or tetrahydrofuran. The halogenating agent is preferably used in approximately equivalent quantities to that of the steroid.

Alternatively, the halogenating reactant may be prepared in situ. For example, 0.9–1.2 equivalents of halogen cation (based on the amount of steroid) such as is obtained from N-bromosuccinimide is added to a reaction mixture containing a halogen anion of greater or equal electronegativity than the cationic reagent. The halogen anion may be supplied by a hydrohalic acid or by a salt such as sodium bromide, lithium chloride, potassium fluoride, or by mixtures of a hydrohalic acid with an alkali metal halide. Whenever an acid is the source of a halogen anion, approximate theoretical quantities are generally used; whereas if a salt is used as the halogen anion source it may be present in large excess. Such an excess of anion is frequently useful to obtain an increased yield or greater purity of product.

Thus, each of our novel compounds may be prepared by any one of several methods. For example, 6α-fluoro-17α-hydroxy-9α,11β-dichloroprogesterone 17-acetate may be prepared from 6α-fluoro-17α-hydroxy-9(11)-dehydroprogesterone 17-acetate by utilizing such reagents and combinations as: (1) chlorine and lithium chloride, (2) N-chlorosuccinimide and lithium chloride, (3) sodium chloride, N-chlorosuccinimide together with hydrogen chloride, (4) chlorine alone, (5) chlorine and hydrogen chloride, and (6) iodobenzene dichloride.

An alternate route for preparing 6-substituted-17α-acyloxy compounds falling under the general formula is by halogenating a 6-substituted-17α-hydroxy-9(11)-dehydroprogesterone (or the 1-dehydro analog) by any of the above described halogenating methods of our invention, with subsequent esterification of the 6-substituted-9α,11β-dihalogeno-17α-hydroxyprogesterone (or the 1-dehydro analog) thereby obtained. In this manner, 6α-fluoro-17α-hydroxy-9(11)-dehydroprogesterone, prepared from the known 6α-fluoro-11β,17α-dihydroxyprogesterone by dehydration at C–9 and C–11 as previously indicated, upon chlorination with a reagent such as chlorine in carbon tetrachloride in the presence of pyridine yields 6α-fluoro-9α,11β-dichloro-17α-hydroxyprogesterone which when esterified with acetic acid and trifluoroacetic anhydride, for example, gives 6α-fluoro-9α,11β-dichloro-17α-hydroxyprogesterone 17-acetate. Other acids may be substituted for acetic acid in the esterification step to obtain the corresponding 17α-acyloxy dihalogenated progesterone.

Our novel halogenating process is also useful in preparing the 1-dehydro compounds falling under the general formula. Thus, a 6,17-disubstituted-9α,11β-dihalogeno-1-dehydroprogesterone falling under the general formula is prepared by utilizing any one of the six reagents and combinations listed previously. In addition, our novel halogenated 1-dehydroprogesterones are obtained from the corresponding halogenated progesterones by microbiological or chemical dehydrogenation techniques as heretofore described.

Our process, whereby a 6,17α-disubstituted-9(11)-dehydroprogesterone is converted to a 6,17α-disubstituted-9α,11β-dihalogeno derivative, is generally carried out in the presence of a non-reacting solvent at temperatures ranging from 5° C. to 50° C. with reaction times varying from one-half hour to 24 hours, depending on the reagents involved. It is preferred that the halogen cation source be present in amounts of 0.9–1.2 equivalents based upon the amount of steroid. The choice of solvent in each reaction is naturally determined by the solubility of the reactants in the process. A preferred reaction condition employs glacial acetic acid as the sole or major solvent with the reaction being carried out at room temperature for a period of approximately two hours.

Although glacial acetic acid is frequently the preferred solvent, other solvents are used in dihalogenation process either alone or in combination with acetic acid. Other solvents which may be employed include lower aliphatic acids such as propionic and diethylacetic, halogenated hydrocarbons such as methylene chloride and chloroform, saturated ethers such as tetrahydrofuran and dioxane, and inert solvents such as dimethyl sulfoxide, as well as suitable mixtures of these solvents.

Further we have found that when carrying out our process in a halogenated hydrocarbon solvent such as methylene chloride, chloroform or carbon tetrachloride, the yield and purity of the dihalogenated progesterone obtained is greatly increased by adding pyridine to the reaction mixture. Preferably up to ten equivalents of pyridine are added and usually one to four, based on the amount of steroid being converted. Other organic basic agents which may also be used in conjunction with a halogenated hydrocarbon solvent are aromatic tertiary amines such as lutidine, collidine, alkyl substituted pyridines and the like. The reaction is usually carried out initially at −20° C. with subsequent warming to about room temperature. The reaction time may be as short as five minutes or as long as several hours. In general, the optimum reaction time is about one hour.

Our novel 6,17α-disubstituted dihalogenated progesterones and the 1-dehydro and 19-nor analogs are active progestational agents by both oral and intramuscular routes, being specific in their action and devoid of androgenic, estrogenic or corticoid activity. That our compounds have progestational activity at all is surprising in view of the art which teaches that the introduction of substituents into the C-ring of progesterone and its derivatives, such as for example, 11β-hydroxyprogesterone and the acetate thereof, eliminates progestational activity or reduces it to such an extent that the compounds are useless for therapeutic purposes. Our C-ring halogen substituted progesterones, on the other hand, are significantly more active than progesterone by the intramuscular route. Orally our compounds are comparable in activity to ethisterone, the known standard oral progestational agent.

In addition to being active both orally and intramuscularly, our halogenated progestins possess the added advantage of having a minimum effect on water, sodium and potassium metabolism. Thus, they may be administered without causing the usual side effects associated with electrolyte imbalance.

Our therapeutically active compounds are useful for the treatment of conditions requiring progestational agents such as the maintenance of pregnancy, or treatment of functional dysmenorrhea, premenstrual tension, habitual or threatened abortion. When administered orally, our compounds are preferably used in the form of tablets containing from 10 to 100 mg. together with the excipients such as starch or milk sugar. For subcutaneous and intramuscular administration, solutions or suspensions of our compounds with a non-toxic liquid vehicle are used. The dosage required may vary with the indications being treated and may range from about 10 to 25 mg. daily.

Our halogenated progestins are also valuable in the veterinary field for treating conditions in both large and small animals which require a progestational agent. In breeding animals, for example, our compounds are useful in preventing threatened abortion. Additional uses are in controlling egg and milk production by regulating the cycle of chickens and cows by the administration of our progestational agents.

The 6-substituted-17α-hydroxy-dihalogenated progesterones falling under the general formula are valuable as intermediates in the preparation of the preferred 6-substituted-17α-acyloxy-dihalogenated progesterones of our invention which have high progestational activity.

The following examples are illustrative of the procedures employed in preparing the compounds of this invention, but are not to be construed as limiting the scope thereof; the scope of our invention being limited only by the appended claims.

In this application whenever the configuration at C–6 is not specifically designated as α or β, both configurations are included.

EXAMPLE 1

*6α - Methyl - 17α - Hydroxy - 4,9(11) - Pregnadiene-3,20-Dione*

(A) 6α-METHYL-17α,21-DIHYDROXY-4,9(11)-PREGNADIENE-3,20-DIONE 21-ACETATE

A solution of 5.0 g. of 6α-methylhydrocortisone acetate in a mixture of 20 ml. of dimethylformamide and 5 ml. of dry pyridine is chilled in an ice bath and there is added dropwise a solution of 3.2 g. of methanesulfonyl chloride in 30 ml. of dimethylformamide. Stirring is continued at room temperature for 28 hours after which the mixture is poured into ice-water. A precipitate forms which is filtered, washed with water and crystallized from acetone-hexane to give 6α-methyl-17α,21-dihydroxy-4,9(11)-pregnadiene-3,20-dione 21-acetate.

(B) 6α-METHYL-17α,21-DIHYDROXY-4,9(11)-PREGNADIENE-3,20-DIONE

A mixture of 2.0 g. of the pregnadiene of Example 1(A) and 100 ml. of 0.27 N methanolic perchloric acid is stirred at room temperature for 18 hours. The reaction mixture is poured into water and the precipitate which forms is filtered and recrystallized from acetone to give 6α-methyl-17α,21-dihydroxy-4,9(11)-pregnadiene-3,20-dione.

(C) 6α-METHYL-17α-HYDROXY-4,9(11)-PREGNADIENE-3,20-DIONE

A solution of 10.4 g. of 6α-methyl-17α,21-dihydroxy-4,9(11)-pregnadiene-3,20-dione (the compound of Example 1(B)) in 100 ml. of dry pyridine is chilled in a Dry Ice-acetone bath and there is added a solution of 6 g. of p-toluenesulfonyl chloride in 50 ml. of methylene chloride. The mixture is stirred in the cold bath for 2 hours and then kept at −20° C. for 24 hours. The reaction mixture is then diluted with methylene chloride and the solution washed with water, 10% sulfuric acid, 10% sodium bicarbonate, very dilute hydrochloric acid and water. The solution is dried over magnesium sulfate, filtered and concentrated to a residue which is dissolved in acetone, treated with decolorizing carbon. The clarified solution is warmed on the steambath, and there is added a warm solution of 10 g. of sodium iodide in acetone. The reaction mixture is heated on the steam bath for five minutes, three ml. of acetic acid added, and after being warmed a few minutes is treated with aqueous sodium bisulfite to reduce the free iodine. The resulting pale yellow solution is poured into water. A precipitate forms, which is filtered, washed with water, and crystallized from acetone-ether to give 6α-methyl-17α-hydroxy-4,9(11)-pregnadiene-3,20-dione.

EXAMPLE 2

6α-Methyl-17α-Hydroxy-4,9(11)-Pregnadiene-3,20-Dione 17-Acetate

To a solution of 5.2 g. of 6α-methyl-17α-hydroxy-4,9(11)-pregnadiene-3,20-dione (the compound of Example 1) in 50 ml. of acetic acid is added 10 ml. of trifluoroacetic anhydride. The solution is heated on the steam bath for 45 minutes, then is poured into ice-water. A solid precipitates which is filtered and crystallized from acetone-ether to give 6α-methyl-17α-hydroxy-4,9(11)-pregnadiene-3,20-dione 17-acetate.

EXAMPLE 3

6α-Methyl-17α-Hydroxy-4,9(11)-Pregnadiene-3,20-Dione 17-Caproate

A mixture of 1.04 g. of 6α-methyl-17α-hydroxy-4,9(11)-pregnadiene-3,20-dione (the compound of Example 1), 5 ml. of caproic acid and 1.0 ml. of trifluoroacetic anhydride is heated at 80° C. for 45 minutes. The mixture is poured into ice-water and the excess acid neutralized with sodium carbonate. The reaction mixture is extracted with methylene chloride and the extracts washed with water, dried over magnesium sulfate, filtered and concentrated to a residue which is crystallized from methanol to yield 6α-methyl-17α-hydroxy-4,9(11)-pregnadiene-3,20-dione 17-caproate.

EXAMPLE 4

6α-Methyl-17α-Hydroxy-4,9(11)-Pregnadiene-3,20-Dione 17-(β-Cyclopentylpropionate)

To a solution of 520 mg. of 6α-methyl-17α-hydroxy-4,9(11)-pregnadiene-3,20-dione (the compound of Example 1) in 10 ml. of cyclopentylpropionic acid and 2.5 ml. of cyclopentylpropionic anhydride, in a vessel flushed with nitrogen, is added 200 mg. of p-toluenesulfonic acid with stirring at a temperature of about 20° C. The reaction mixture is allowed to stand for 4 hours, then poured into ice-water. Excess acid is neutralized with sodium carbonate, and the reaction mixture extracted with ether. The ether solution is evaporated to a residue which is crystallized from methanol to give 6α-methyl-17α-hydroxy-4,9(11)-pregnadiene-3,20-dione 17-(β-cyclopentylpropionate).

EXAMPLE 5

6α-Methyl-17α-Hydroxy-1,4,9(11)-Pregnatriene-3,20-Dione (A) 6α-METHYL-17α,21-DIHYDROXY-1,4,9(11)-PREGNATRIENE-3,20-DIONE 21-ACETATE Five grams of 6α-methyl-11β,17α,21-trihydroxy-1,4-pregnadiene-3,20-dione 21-acetate are dissolved in 20 ml. of dry dimethylformamide and 4 ml. of dry pyridine. The solution is chilled in an ice bath and to it is added dropwise 3.05 g. of methanesulfonyl chloride which has been diluted to 30 ml. with dimethylformamide. After the addition has been completed, stirring is continued at room temperature for 48 hours. The reaction mixture is then poured into cold, dilute sulfuric acid. A precipitate forms which is filtered, air-dried, and crystallized from methanol to yield 6α-methyl-17α,21-dihydroxy-1,4,9(11)-pregnatriene-3,20-dione 21-acetate, $\lambda_{max.}^{MeOH}$ 240 mμ

(B) 6α-METHYL-17α,21-DIHYDROXY-1,4,9(11)-PREGNATRIENE-3,20-DIONE

Two grams of 6α-methyl-17α,21-dihydroxy-1,4,9(11)-pregnatriene-3,20-dione 21-acetate, prepared as described in Example 5(A), is hydrolyzed with methanolic perchloric acid in the manner described in Example 1(B) to give 6α-methyl-17α,21-dihydroxy-1,4,9(11)-pregnatriene-3,20-dione.

(C) 6α-METHYL-17α-HYDROXY-1,4,9(11)-PREGNATRIENE-3,20-DIONE

In the manner described in Example 1(C) 6α-methyl-17α,21-dihydroxy-1,4,9(11)-pregnatriene-3,20-dione (the compound of Example 5(B)) is reacted with p-toluenesulfonyl chloride followed by sodium iodide and the resultant product isolated and purified to give 6α-methyl-17α-hydroxy-1,4,9(11)-pregnatriene-3,20-dione.

EXAMPLE 6

6α-Methyl-17α-Hydroxy-1,4,9(11)-Pregnatriene-3,20-Dione 17-Acetate

In the manner described in Example 2, 3 g. of 6α-methyl-17α-hydroxy-1,4,9(11)-pregnatriene-3,20-dione (the compound of Example 5) are reacted with acetic acid in the presence of trifluoroacetic anhydride and the resultant product isolated and purified to give 6α-methyl-17α-hydroxy-1,4,9(11)-pregnadiene-3,20-dione 17-acetate.

EXAMPLE 7

6α-Fluoro-17α-Hydroxy-4,9(11)-Pregnadiene-3,20-Dione

In the manner described in Example 1(A), 10 g. of 6α-fluoro-11β,17α-dihydroxyprogesterone are reacted with 6.4 g. of methanesulfonyl chloride in dimethylformamide-pyridine and the resultant product isolated and purified to give 6α-fluoro-17α-hydroxy-4,9(11)-pregnadiene-3,20-dione.

EXAMPLE 8

6α-Fluoro-17α-Hydroxy-4,9(11)-Pregnadiene-3,20-dione 17-Acetate

In the manner described in Example 2, 6α-fluoro-17α-hydroxy-4,9(11)-pregnadiene-3,20-dione (the compound of Example 7) is esterified with acetic acid in the presence of trifluoroacetic anhydride to give 6α-fluoro-17α-hydroxy-4,9(11)-pregnadiene-3,20-dione 17-acetate.

EXAMPLE 9

6α-Fluoro-17α-Hydroxy-4,9(11)-Pregnadiene-3,20-Dione 17-Caproate

In the manner described in Example 3, 6α-fluoro-17α-hydroxy-4,9(11)-pregnadiene-3,20-dione, prepared as described in Example 7 is reacted with caproic acid in the presence of trifluoroacetic anhydride and the resultant product isolated and purified to give 6α-fluoro-17α-hydroxy-4,9(11)-pregnadiene-3,20-dione 17-caproate.

EXAMPLE 10

6α-Fluoro-9α,11β-Dichloro-17α-Hydroxyprogesterone 17-Acetate (A) 6α-fluoro-17α-hydroxy-4,9(11)-pregnadiene-3,20-dione 17-acetate (the compound of Example 8) is reacted with 380 mg. of 96% N-chlorosuccinimide in the presence of hydrogen chloride and lithium chloride by mixing 3.0 g. of lithium chloride in 50 ml. of glacial acetic acid and cooling to about 10° C. before adding about 200 mg. of hydrogen chloride in 1 ml. of tetrahydrofuran followed by 380 mg. of 96% N-chlorosuccinimide. Stir the solution at room temperature in the dark for 20 minutes and pour into ice water with stirring. Filter, wash with water and triturate with ether and the resultant product isolated and purified to give 6α-fluoro-9α,11β-dichloro-17α-hydroxyprogesterone 17-acetate.

Alternatively, the compound of this example is prepared by the following procedures (B) and (C).

(B) 6α-FLUORO-9α,11β-DICHLORO-17α-HYDROXYPROGESTERONE

17α-hydroxy-4,9(11)-pregnadiene-3,20-dione (the compound of Example 7) is reacted with 225 mg. of chlorine in carbon tetrachloride in the presence of 0.75 ml. of pyridine by adding the chlorine to a mixture of the steroid in carbon tetrachloride. The mixture is stirred at 20° C. for 15 minutes and allowed to warm to room temperature over a period of ½ hour and the resultant product isolated and purified to give 6α-fluoro-9α,11β-dichloro-17α-hydroxyprogesterone.

(C) 6α-FLUORO-9α,11β-DICHLORO-17α-HYDROXYPROGESTERONE 17-ACETATE

The 17α-hydroxyprogesterone of Example 10(B) is esterified to the corresponding 17-acetate with acetic acid in the presence of trifluoroacetic anhydride in the manner described in Example 2 to give 6α-fluoro-9α,11β-dichloro-17α-hydroxyprogesterone 17-acetate.

Similarly, by substituting other lower alkanoic acids such as propionic, butyric or caproic for acetic acid in the above procedure, the corresponding 17-esters are prepared, i.e. 17-propionate, 17-butyrate and 17-caproate of 6α-fluoro-9α,11β-dichloro-17α-hydroxyprogesterone.

EXAMPLE 11

*6α,11β-Difluoro-9α-Chloro-17α-Hydroxyprogesterone 17-Acetate*

6α - fluoro - 17α - hydroxy - 4,9(11) - pregnadiene-3,20-dione 17-acetate (the compound of Example 8) is reacted with 190 mg. of 96% N-chlorosuccinimide in the presence of hydrogen fluoride by admixing the steroid with 25 ml. of diethylacetic acid to which is added 200 mg. of N-chlorosuccinimide followed by a solution of 600 mg. of hydrogen fluoride in 3.2 ml. of a mixture of tetrahydrofuran and chloroform. The reaction mixture is stirred for 48 hours at room temperature and poured into sodium carbonate solution. The resultant product is isolated to a residue which is chromatographed on silica gel. The material eluted with 30% ether in hexane is crystallized from methylene chloride-pentane to give 6α,11β-difluoro-9α-chloro-17α-hydroxyprogesterone 17-acetate.

EXAMPLE 12

*6α-Fluoro-9α,11β-Dichloro-17α-Hydroxyprogesterone 17-Caproate*

(A) 6α - fluoro - 17α - hydroxy - 4,9(11)-pregnadiene-3,20-dione 17-caproate (the compound of Example 9) is reacted with N-chlorosuccinimide in the presence of hydrogen chloride and lithium chloride, by mixing 3.0 gm. of lithium chloride in 50 ml. of glacial acetic acid and cooling to about 10° C. before adding about 200 mg. of hydrogen chloride in 1 ml. of tetrahydrofuran followed by 380 mg. of 96% N-chlorosuccinimide. Stir the solution at room temperature in the dark for 20 minutes and pour into ice water with stirring. Filter, wash with water and triturate with ether, and the resultant product isolated and purified to give 6α-fluoro-9α,11β-dichloro-17α-hydroxyprogesterone 17-caproate.

Alternatively, the compound of this example may be prepared according to following procedure B.

(B) 6α - fluoro - 9α,11β - dichloro - 17α - hydroxyprogesterone, prepared as described in Example 10(B) is esterified with caproic acid in the presence of trifluoroacetic anhydride in the manner described in Example 3 to give 6α-fluoro-9α,11β-dichloro-17α-hydroxyprogesterone 17-caproate.

EXAMPLE 13

*6α,11β-Difluoro-9α-Bromo-17α-Hydroxyprogesterone 17-Acetate*

(A) 6α - fluoro - 17α - hydroxy - 4,9(11) - pregnadiene-3,20-dione 17-acetate (the compound of Example 8) is reacted with 410 mg. of N-bromoacetamide and 500 mg. of hydrogen fluoride in acetic acid by admixing the steroid and the N-bromoacetamide in acetic acid. Add a solution of the hydrogen fluoride in 20 ml. of acetic acid. Stir the mixture at room temperature for 2 hours and pour into ice water with stirring. The aqueous solution is decanted from the resulting resinous precipitate which is dissolved in acetone-ether and filtered through a column of Florisil in ether. The material eluted with ether is combined, the ether removed in vacuo and the resultant residue triturated with pentane-ether. The resultant product is isolated in the described manner and crystallized from acetone-hexane to give 6α,11β-difluoro-9α-bromo-17α-hydroxyprogesterone 17-acetate.

Alternatively, the compound of this example is prepared according to following procedures B and C.

(B) 6α,11β-DIFLUORO-9α-BROMO-17α-HYDROXYPROGESTERONE

6α - fluoro - 17α - hydroxy - 4,9(11) - pregnadiene-3,20-dione (the compound of Example 7) is reacted with 205 mg. of 95% N-bromoacetamide and hydrogen fluoride by adding the 500 mg. of hydrogen fluoride in 4 ml. of chloroform-tetrahydrofuran to a solution of the steroid in 50 ml. of diethylacetic acid followed by addition of the N-bromo-acetamide. The solution is stirred at room temperature for 1½ hours and then poured into potassium carbonate solution and stirred well to neutralize all of the diethylacetic acid, and the resultant product isolated and purified to give 6α,11β-difluoro-9α-bromo-17α-hydroxyprogesterone.

(C) 6α,11β-DIFLUORO-9α-BROMO-17α-HYDROXYPROGESTERONE 17-ACETATE

In the manner described in Example 2, the 17α-hydroxy of Example 13(B) is esterified with acetic acid in the presence of trifluoroacetic anhydride to give 6α,11 -difluoro-9α-bromo-17α-hydroxyprogesterone 17-acetate.

EXAMPLE 14

*6α-Fluoro-9α-Iodo-11β-Chloro-17α-Hydroxyprogesterone 17-Acetate*

6α - fluoro - 17α - hydroxy - 4,9(11) - pregnadiene-3,20-dione 17-acetate (the compound of Example 8) is reacted with 425 mg. of iodine monochloride and 3 g. of lithium chloride in tetrahydrofuran in the presence of 3 drops of perchloric acid by adding the perchloric acid dropwise to a solution of the steroid in 40 ml. of tetrahydrofuran chilled to 0° C. There is also added the lithium chloride followed by dropwise additions of a solution of iodine monochloride in 5 ml. of tetrahydrofuran. The reaction mixture is stirred at room temperature for 5 hours then poured into ice water. The gummy precipitate which forms is dissolved in warm methylene chloride, decoloring carbon added, then filtered. Pentane is added to the clarified methylene chloride solution. A solid separates which is filtered and crystallized from acetone-hexane to give 6α-fluoro-9α-iodo-11β-chloro-17α-hydroxyprogesterone 17-acetate.

EXAMPLE 15

*6α-Fluoro-9α,11β-Dibromo-17α-Hydroxyprogesterone 17-Acetate*

6α - fluoro - 17α - hydroxy - 4,9(11) - pregnadiene-3,20-dione 17-acetate (the compound of Example 8) is brominated with N-bromoacetamide, lithium bromide and hydrogen bromide in acetic acid by adding 10 mg. of N-bromoacetamide to 1 gram of the steroid and 4 grams of lithium bromide in 50 ml. of acetic acid followed by 220 mg. of hydrogen bromide in 4.5 ml. of acetic acid. The mixture is stirred at room temperature for one hour and poured into ice water. A solid forms which is filtered, washed with water and crystallized from acetone-hexane to give 6α-fluoro-9α,11β-dibromo-17α-hydroxyprogesterone 17-acetate.

EXAMPLE 16

*6α-Fluoro-17α-Hydroxy-1,4,9(11)-Pregnatriene-3,20-Dione*

Five grams of 6α-fluoro-11β,17α-dihydroxy-1,4-pregnadiene-3,20-dione is dehydrated with methanesulfonyl chloride in dimethylformamide-pyridine according to the procedure of Example 1(A). The product is isolated and purified in the described manner to give 6α-fluoro-17α-hydroxy-1,4,9(11)-pregnatriene-3,20-dione.

EXAMPLE 17

*6α-Fluoro-17α-Hydroxy-1,4,9(11)-Pregnatriene-3,20-Dione 17-Acetate*

The 6α-fluoro-17α-hydroxypregnatriene of Example 15 is esterified with acetic acid and trifluoroacetic anhydride in the manner of Example 2 to give 6α-fluoro-17α-hydroxy-1,4,9(11)-pregnatriene-3,20-dione 17-acetate.

EXAMPLE 18

*6α-Fluoro-9α,11β-Dichloro-17α-Hydroxy-1,4-Pregnadiene-3,20-Dione 17-Acetate*

(A) In the manner described in Example 10(A), 6α-fluoro - 17α - hydroxy-1,4,9(11)-pregnatriene-3,20-dione 17-acetate (the compound of Example 17) is reacted with 380 mg. of 96% N-chlorosuccinimide in the presence of hydrogen chloride and lithium chloride and the resultant product isolated and purified to give 6α-fluoro-9α,11β-dichloro-17α-hydroxy-1,4-pregnadiene-3,20-dione 17-acetate.

Alternatively, the compound of this example may be prepared by the following procedures, (B) and (C).

(B) 6α-FLUORO-9α,11β-DICHLORO-17α-HYDROXY-1,4-PREGNADIENE-3,20-DIONE

In the manner described in Example 10(B), 6α-fluoro-17α-hydroxy-1,4,9(11)-pregnatriene-3,20-dione (the compound of Example 16) is reacted with chlorine in carbon tetrachloride in the presence of pyridine and the resultant product isolated and purified to give 6α-fluoro-9α,11β-dichloro-17α-hydroxy-1,4-pregnadiene-3,20-dione.

(C) 6α-FLUORO-9α,11β-DICHLORO-17α-HYDROXY-1,4-PREGNADIENE-3,20-DIONE 17-ACETATE

6α - fluoro - 9α,11β-dichloro-17α-hydroxy-1,4-pregnadiene-3,20-dione (the compound of Example 18(B)) is esterified in the manner described in Example 2 with acetic acid in the presence of trifluoroacetic anhydride to give 6α-fluoro-9α,11β-dichloro-17α-hydroxy-1,4-pregnadiene-3,20-dione 17-acetate.

Similarly, by substituting other lower alkanoic acids such as propionic, butyric or caproic acid for acetic acid in the above procedure, the corresponding 17-esters are prepared i.e. the 17-propionate, 17-butyrate and 17-caproate of 6α-fluoro-9α,11β-dichloro-17α-hydroxy-1,4-pregnadiene-3,20-dione.

EXAMPLE 19

*6α-Fluoro-9α-Bromo-11β-Chloro-17α-Hydroxy-1,4-Pregnadiene-3,20-Dione 17-Acetate*

One gram of 6α-fluoro-17α-hydroxy-1,4,9(11)-pregnatriene-3,20-dione 17-acetate prepared as described in Example 17 and 4 g. of lithium chloride are dissolved in 50 ml. of glacial acetic acid. There is first added 360 mg. of N-bromoacetamide and then 95 mg. of hydrogen chloride in 40 ml. of acetic acid. The reaction mixture is stirred at room temperature for 30 minutes and then is poured into ice-water with stirring. A solid results which is filtered, washed with water and crystallized from acetone-hexane to give 6α-fluoro-9α-bromo-11β-chloro-17α-hydroxy-1,4-pregnadiene-3,20-dione 17-acetate.

EXAMPLE 20

*6β-Fluoro-17α-Hydroxy-4,9(11)-19-Norpregnadiene-3,20-Dione 17-Acetate*

(A) 6β-FLUORO-11β,17α-DIHYDROXY-19-NORPROGESTERONE 17-ACETATE

A living culture of the organism *Curvularia lunata* (N.R.R.L. 2380) is rinsed from an agar slant under sterile conditions into a sterile medium having the following composition:

|  | Percent |
| --- | --- |
| Malt extract | 5 |
| Sucrose | 1 |
| Sodium nitrate | 0.2 |
| Potassium chloride | 0.05 |
| Magnesium sulfate heptahydrate | 0.05 |
| Ferrous sulfate heptahydrate | 0.05 |
| Dipotassium acid phosphate | 0.1 |
| Distilled water, adjusted to pH 7.0 with potassium hydroxide. | |

100 ml. of this medium is placed in each of several 300 ml. flasks. To each flask is added 50 mg. of 6β-fluoro-17α-hydroxy-19-norprogesterone 17-acetate dissolved in a small volume of acetone. The mixture is shaken for a period of 7 days at a room temperature of about 28° C. The contents of the flasks are then combined and extracted with several portions of ethylene dichloride using one-fifth the volume of the aqueous phase each time. The combined organic extracts are dried over sodium sulfate, filtered and concentrated in vacuo to a residue having a volume of 1–2 ml.

The ethylene dichloride residue is then placed on a chromatographic column consisting of silica gel, mixed with a small volume of methylene chloride. The column is developed with methylene chloride and the eluates are combined and concentrated in vacuo to a residue which is crystallized from acetone-hexane to give 6β-fluoro-11β,17α-dihydroxy-19-norprogesterone 17-acetate.

(B) 6β-FLUORO-17α-HYDROXY-4,9(11)-19-NORPREGNADIENE-3,20-DIONE 17-ACETATE

Three grams of 6β-fluoro-11β,17α-dihydroxy-19-norprogesterone 17-acetate (the compound of Example 20(A)) is reacted with 3 g. of methane-sulfonyl chloride in dimethylformamide and pyridine for 90 hours at 0° C. in a manner similar to that described in Example 5(A). The resultant product is isolated in the descirbed manner and crystallized from methylene chloride-pentane to give 6β - fluoro-17α-hydroxy-4,9(11)-19-norpregnadiene-3,20-dione 17-acetate.

EXAMPLE 21

*6β-Fluoro-9α,11β-Dichloro-17α-Hydroxy-19-Norprogesterone 17-Acetate*

To one gram of 6β-fluoro-17α-hydroxy-4,9(11)-19-norpregnadiene-3,20-dione 17-acetate (the compound of Example 20) dissolved in 30 ml. of carbon tetrachloride, there is first added at —20° C. 0.5 ml. of pyridine and then 190 mg. of chlorine gas in 2.5 ml. of carbon tetrachloride. The reaction mixture is stirred at —20° C. for 15 minutes, then allowed to warm to room temperature over a period of one-half hour. The solution is filtered and the filtrate concentrated in vacuo to a residue which is triturated with ether. A solid precipitate results which is filtered then crystallized from acetone-hexane to give 6β-fluoro-9α,11β-dichloro-17α-hydroxy-19-norprogesterone 17-acetate.

EXAMPLE 22

*6α-Fluoro-17α-Hydroxy-4,9(11)-19-Norpregnadiene-3,20-Dione 17-Acetate*

(A) 6α-FLUORO-11β,17α-DIHYDROXY-19-NORPROGESTERONE 17-ACETATE

In the manner described in Example 20(A), 6α-fluoro-17α-hydroxy-19-norprogesterone 17-acetate is subjected to the action of a culture of the organism *Curvularia lunata* and the resultant product isolated and purified in the described manner to give 6α-fluoro-11β,17α-dihydroxy-19-norprogesterone 17-acetate.

(B) 6α-FLUORO-17α-HYDROXY-4,9(11)-19-NORPREGNADIENE-3,20-DIONE 17-ACETATE

6α-fluoro-11β,17α-dihydroxy-19-norprogesterone 17-acetate (the compound of Example 22(A)) is reacted with methanesulfonyl chloride in dimethylformamide and pyridine at 0° C. for 90 hours in the manner described in Example 20(B) and the resultant product isolated and purified to give 6α-fluoro-17α-hydroxy-4,9(11)-19-norpregnadiene-3,20-dione 17-acetate.

EXAMPLE 23

*6α-Fluoro-9α,11β-Dichloro-17α-Hydroxy-19-Norprogesterone 17-Acetate*

One gram of 6α-fluoro-17α-hydroxy-4,9(11)-19-norpregnadiene-3,20-dione 17-acetate (the compound of Example 22(B)) is chlorinated with 190 mg. of chlorine gas in carbon tetrachloride in the presence of 0.5 ml. of pyridine in the manner described in Example 21 and the resultant product isolated and purified to give 6α-fluoro-9α,11β-dichloro-17α-hydroxy-19-norprogesterone 17-acetate.

Alternatively, the compound of this example is prepared by heating a solution of 500 mg. of 6β-fluoro-9α,11β-dichloro-17α-hydroxy-19-norprogesterone 17-acetate (the compound of Example 21) in 25 ml. of ethanol containing 2 ml. of concentrated hydrochloric acid at reflux temperature for 30 minutes. The reaction mixture is then cooled, poured into water and a solid precipitate forms which is filtered and recrystallized from acetone-hexane to give 6α-fluoro-9α,11β-dichloro-17α-hydroxy-19-norprogesterone 17-acetate.

EXAMPLE 24

*6β-Fluoro-17α-Hydroxy-4,9(11)-Pregnadiene-3,20-Dione 17-Acetate*

(A) 6β-FLUORO-11β,17α-DIHYDROXYPROGESTERONE 17-ACETATE

In the manner described in Example 20(A), 6β-fluoro-17α-hydroxyprogesterone 17-acetate is subjected to the action of a culture of the organism *Curvularia lunata* and the resultant product isolated and purified to give 6β-fluoro-11β,17α-dihydroxyprogesterone 17-acetate.

(B) 6β-FLUORO-17α-HYDROXY-4,9(11)-PREGNADIENE-3,20-DIONE 17-ACETATE

Four grams of 6β-fluoro-11β,17α-dihydroxyprogesterone 17-acetate (the compound of Example 24(A)) is reacted with methanesulfonyl chloride in dimethylformamide-pyridine at room temperature for 24 hours in a manner similar to that described in Example 5(A). The resultant product is isolated and purified in the described manner to give 6β-fluoro-17α-hydroxy-4,9(11)-pregnadiene-3,20-dione 17-acetate.

EXAMPLE 25

*6β-Fluoro-9α,11β-Dichloro-17α-Hydroxyprogesterone 17-Acetate*

In a manner similar to that described in Example 21, 1 g. of 6β-fluoro-17α-hydroxy-4,9(11)-pregnadiene-3,20-dione 17-acetate (the compound of Example 24) is chlorinated with 190 mg. of chlorine in carbon tetrachloride containing 0.5 ml. of pyridine and the resultant product isolated and purified to give 6β-fluoro-9α,11β-dichloro-17α-hydroxyprogesterone 17-acetate.

EXAMPLE 26

*6β-Fluoro-9α-Bromo-11β-Chloro-17α-Hydroxyprogesterone 17-Acetate*

In a manner similar to that described in Example 19, 1 g. of 6β-fluoro-17α-hydroxy-4,9(11)-pregnadiene-3,20-dione 17-acetate (the compound of Example 24) is reacted with 360 mg. of N-bromoacetamide and 95 mg. of hydrogen chloride in the presence of 4 g. of lithium chloride. The resultant product is isolated in the described manner and crystallized from acetone-hexane to give 6β-fluoro-9α-bromo-11β-chloro-17α-hydroxyprogesterone 17-acetate.

EXAMPLE 27

*6β,11β-Difluoro-9α-Iodo-17α-Hydroxyprogesterone 17-Acetate*

To a solution of 470 mg. of 6β-fluoro-17α-hydroxy-4,9(11)-pregnadiene-3,20-dione 17-acetate (the compound of Example 24) and 3 g. of potassium fluoride in 40 ml. of dimethylsulfoxide there is added 320 mg. of N-iodosuccinimide. The reaction mixture is stirred at room temperature for 16 hours, poured into ice-water and extracted with methylene chloride. The combined organic extracts are warmed, decolorizing carbon added, then filtered, and the filtrate concentrated in vacuo. The resultant residue is chromatographed on silica gel. The fraction eluted with 50% ether-hexane yields 6β,11β-difluoro-9α-iodo-17α-hydroxyprogesterone 17-acetate.

EXAMPLE 28

*6α,11β-Difluoro-9α-Iodo-17α-Hydroxyprogesterone 17-Acetate*

300 mg. of 6β,11β-difluoro-9α-iodo-17α-hydroxyprogesterone 17-acetate (the compound of Example 27) dissolved in 10 ml. of ethanol which has been saturated with hydrogen chloride gas is warmed on the steam bath for 30 minutes, then poured into water. A solid precipitates which is filtered and crystallized from acetone-hexane to give 6α,11β-difluoro-9α-iodo-17α-hydroxyprogesterone 17-acetate.

Similarly, other 6β-fluoro analogs such as 6β-fluoro-9α,11β-dichloro-17α-hydroxyprogesterone 17-acetate (the compound of Example 25) and 6β-fluoro-9α-bromo-11β-chloro-17α-hydroxy 17-acetate (the compound of Example 26) are converted to their corresponding 6α-fluoro analogs by means of ethanolic hydrogen chloride in the manner described above.

EXAMPLE 29

*6β,17α-Dimethylprogesterone*

(A) 17α-METHYLPROGESTERONE 3,20-BISETHYLENE KETAL

17α-methylprogesterone (30 g.) in 1 liter of dry benzene and 400 ml. of ethylene glycol is refluxed under a Dean-Stark separator for 18 hours in the presence of 500 mg. of p-toluene sulfonic acid. The reaction mixture is diluted with water and the organic layer separated. The benzene solution is washed with 5% aqueous sodium bicarbonate and water, and concentrated to a residue under reduced pressure. Addition of ether to this residue gives a solid which is recrystallized from acetone-ether yielding a product substantially of 17α-methylprogesterone 3,20-bisethylene ketal.

(B) 5α,6α-EPOXY-17α-METHYLPREGNANE-3,20-DIONE 3,20-BISETHYLENE KETAL

To a solution of 20 g. of the bisethylene ketal of Example 29(A) in 320 ml. of chloroform containing 4 drops of pyridine is added a solution of 14.7 g. of monoperphthalic acid in 200 ml. of ether at 0° C. The mixture is allowed to stand at 0° C. for 24 hours, then diluted with ether and washed three times with 5% aqueous bicarbonate and twice with water. The solution is dried over magnesium sulfate, filtered and the solvent removed in vacuo. The resultant residue is chromatographed on Florisil in hexane. The column is first eluted with 20–40% ether in hexane to separate the 5β,6β-epoxide of 17α-methylpregnane - 3,20 - dione 3,20-bisethylene ketal from the desired product. The column is then eluted with 100% ether and 1% acetone in ether, and the eluates concentrated in vacuo to a residue which is crystallized from acetone-hexane to give 5α,6α-epoxy-17α-methylpregnane-3,20-dione 3,20-bisethylene ketal.

(C) 5α-HYDROXY-6β,17α-DIMETHYLPREGNANE-3,20-DIONE

The 5α,6α-epoxide of Example 29(B) (10 g.) in 200 ml. of tetrahydrofuran and 200 ml. of benzene is added to a Grignard reagent prepared from 5 g. of magnesium and 15 ml. of methyl iodide in 200 ml. of ether. The ether is distilled off and the reaction mixture is refluxed for 19 hours. The mixture is chilled and an aqueous ammonium chloride solution added. The solvent layers are separated and the organic layer washed with water and concentrated. The resultant residue is dissolved in 200 ml. of 90% aqueous methanol, refluxed with 3 g. of oxalic acid for 30 minutes, then poured into water. A solid forms which is filtered and crystallized from acetone-hexane to give 5α-hydroxy-6β,17α-dimethylpregnane-3,20-dione.

(D) 6β,17α-DIMETHYLPROGESTERONE

The 5α-hydroxy compound of Example 29(C) (2.0 g.) is dissolved in 25 ml. of pyridine, the solution chilled in an ice-salt bath, and 1.2 ml. of cold thionyl chloride added dropwise. After 10 minutes the solution is poured into ice water. A solid product forms which is filtered, washed well with water and crystallized from aqueous methanol to give 6β,17α-dimethylprogesterone.

EXAMPLE 30

6β,17α-Dimethyl-4,9(11)-Pregnadiene-3,20-Dione (A) 6β,17α-DIMETHYL-11β-HYDROXYPROGESTERONE Five grams of 6β,17α-dimethylprogesterone (the compound of Example 29) is fermented with a culture of the organism Curvularia lunata in the manner described in Example 20(A). The resultant product is isolated in the described manner and crystallized from acetone-hexane to give 6β,17α-dimethyl-11β-hydroxyprogesterone.

(B) 6β,17α-DIMETHYL-4,9(11)-PREGNADIENE-3,20-DIONE

Four grams of 6β,17α-dimethyl-11β-hydroxyprogesterone (the compound of Example (29(A)) in dimethylformamide-pyridine is reacted with methanesulfonyl chloride in a manner similar to that described in Example 5(A). The resultant product is isolated in the described manner and crystallized from acetone-hexane to give 6β,17α-dimethyl-4,9(11)-pregnadiene-3,20-dione.

EXAMPLE 31

6α,17α-Dimethyl-4,9(11)-Pregnadiene-3,20-Dione (A) A solution of 1.5 g. of 6β,17α-dimethyl-4,9(11)-pregnadiene-3,20-dione (the compound of Example 30) in 80 ml. of 90% aqueous methanol containing 1.5 g. of potassium hydroxide is refluxed under nitrogen for 16 hours. The solution is poured into water and a solid separates which is filtered and crystallized twice from acetone-hexane to give 6α,17α-dimethyl-4,9(11)-pregnadiene-3,20-dione.

Alternatively, the compound of this example is prepared by the following procedures (B), (C) and (D).

(B) 6α,17α-DIMETHYLPROGESTERONE

Two grams of 5α-hydroxy-6β,17α-dimethylpregnane-3,20-dione (the compound of Example 29(C)) in 150 ml. of ethanol containing 0.5 ml. of concentrated hydrochloric acid is refluxed for 30 minutes. The solution is then poured into water, the resultant solid filtered, and crystallized from aqueous methanol to give 6α,17α-dimethylprogesterone.

(C) 6α,17α-DIMETHYL-11β-HYDROXYPROGESTERONE

6α,17α-dimethylprogesterone (the compound of Example 44(B)) is subjected to the action of a culture of the organism Curvularia lunata in a manner similar to that described in Example 20(A) and the resultant product isolated and purified to give 6α,17α-dimethyl-11β-hydroxyprogesterone.

(D) 6α,17α-DIMETHYL-4,9(11)-PREGNADIENE-3,20-DIONE

6α,17α - dimethyl-11β-hydroxyprogesterone (the compound of Example 31(C)) is reacted with methanesulfonyl chloride in dimethylformamide-pyridine in the manner described in Example 5(A) and the resultant product isolated and purified to give 6α,17α-dimethyl-4,9(11)-pregnadiene-3,20-dione.

EXAMPLE 32

6β-Fluoro-17α-Methylprogesterone (A) 5α-HYDROXY-6β-FLUORO-17α-METHYLPREGNANE-3,20-DIONE To 5 g. of 5α,6α-epoxy-17α-methylpregnane-3,20-dione 3,20-bisethylene ketal (the compound of Example 29(B)) in 100 ml. of methylene chloride is added 5 ml. of 48% hydrofluoric acid. The mixture is stirred for 6 hours, then washed with water and concentrated to a residue. The residue is dissolved in 60 ml. of methanol and refluxed with 2 ml. of 1 N-sulfuric acid for 30 minutes. The solution is diluted with water and extracted with methylene chloride. The extract is washed with water, dried over magnesium sulfate, filtered and evaporated to a residue which is chromatographed on Florisil. The fractions eluted with 60–100% ether in hexane are combined and evaporated to a residue which is crystallized from acetone-hexane to give 5α-hydroxy-6β-fluoro-17α-methylpregnane-3,20-dione.

(B) 6β-FLUORO-17α-METHYLPROGESTERONE

The 5α-hydroxy compound of Example 32(A) (2.0 g.) is dehydrated with thionyl chloride according to the procedure of Example 29(D). The resultant product is isolated in the described manner and crystallized from aqueous methanol to give 6β-fluoro-17α-methylprogesterone.

EXAMPLE 33

6β-Fluoro-17α-Methyl-4,9(11)-Pregnadiene-3,20-Dione (A) 6β-FLUORO-11β-HYDROXY-17α-METHYLPROGESTERONE Four grams of 6β-fluoro-17α-methylprogesterone (the compound of Example 32) is subjected to the action of a culture of the organism Curvularia lunata and the resultant product isolated and purified in the manner described in Example 20(A) to give 6β-fluoro-11β-hydroxy-17α-methylprogesterone.

(B) 6β-FLUORO-17α-METHYL-4,9(11)-PREGNADIENE-3,20-DIONE

In a manner similar to that described in Example 5(A), 6β-fluoro-11β-hydroxy-17α-methylprogesterone (the compound of Example 33(A)) is dehydrated with methanesulfonyl chloride in dimethylformamide-pyridine and the resultant product isolated in the described manner and crystallized from acetone-hexane to give 6β-fluoro-17α-methyl-4,9(11)-pregnadiene-3,20-dione.

EXAMPLE 34

*6α-Fluoro-17α-Methyl-4,9(11)-Pregnadiene-3,20-Dione*

(A) Two grams of 6β-fluoro-17α-methyl-4,9(11)-pregnadiene-3,20-dione (the compound of Example 33) is isomerized by means of ethanolic hydrochloric acid according to the alternative procedure of Example 23 and the resultant product isolated and purified to give 6α-fluoro-17α-methyl-4,9(11)-pregnadiene-3,20-dione.

Alternatively, the compound of this example is prepared by the following procedures B, C and D.

(B) 6α-FLUORO-17α-METHYLPROGESTERONE

5α - hydroxy-6β-fluoro-17α-methylpregnane-3,20-dione (the compound of Example 32(A)) is reacted with refluxing ethanolic hydrochloric acid and the resultant product isolated and purified in the manner described in Example 31(B) to give 6α-fluoro-17α-methylprogesterone.

(C) 6α-FLUORO-11β-HYDROXY-17α-METHYL-PROGESTERONE

In the manner described in Example 20(A), 6α-fluoro-17α-methylprogesterone (the compound of Example 34(B)) is subjected to the action of a culture of the organism of *Curvularia lunata* and the resultant product isolated and purified to give 6α-fluoro-11β-hydroxy-17α-methylprogesterone.

(D) 6α-FLUORO-17α-METHYL-4,9(11)-PREGNADIENE-3,20-DIONE

In the manner described in Example 5(A), 6α-fluoro-11β-hydroxy-17α-methylprogesterone, prepared as in Example 34(C), is reacted with methanesulfonyl chloride in dimethylformamide-pyridine and the resultant product isolated and purified to give 6α-fluoro-17α-methyl-4,9(11)-pregnadiene-3,20-dione.

EXAMPLE 35

*6α-Methyl-17α-Bromoprogesterone*

(A) 17α-BROMOPROGESTERONE 3,20-BISETHYLENE KETAL

Ten grams of 17α-bromoprogesterone is reacted with ethylene glycol in the presence of p-toluenesulfonic acid according to the procedure of Example 29(A). The resultant product is isolated in the described manner and crystallized from acetone-ether to give 17α-bromoprogesterone 3,20-bisethylene ketal.

(B) 5α,6α-EPOXY-17α-BROMOPREGNANE-3,20-DIONE 3,20-BISETHYLENE KETAL

Five grams of the bisethylene ketal prepared in Example 35(A) is reacted with monoperphthalic acid according to the procedure of Example 40(B) and the resultant product isolated and purified to give 5α,6α-epoxy-17α-bromopregnane-3,20-dione 3,20-bisethylene ketal.

(C) 5α-HYDROXY-6β-METHYL-17α-BROMOPREGNANE-3,20-DIONE

Five grams of the 5α,6α-epoxy bisethylene ketal of Example 35(B) is reacted with methyl magnesium iodide and the resultant product treated with oxalic acid and isolated in the manner described in Example 29(C). The isolated product is crystallized from acetone-hexane to give 5α - hydroxy-6β-methyl-17α-bromopregnane-3,20-dione.

(D) 6α-METHYL-17α-BROMOPROGESTERONE

Two grams of 5α - hydroxy - 6β - methyl-17α-bromo-pregnane-3,20-dione, prepared as described in Example 35(C), is dissolved in 150 ml. of ethanol containing 0.5 ml. of concentrated hydrochloric acid. The solution is refluxed for 30 minutes, then cooled and poured into water. A solid separates which is filtered and crystallized from aqueous methanol to give 6α-methyl-17α-bromoprogesterone.

EXAMPLE 36

*6α-Methyl-17α-Bromo-4,9(11)-Pregnadiene-3,20-Dione*

(A) 6α-METHYL-11β-HYDROXY-17α-BROMO-PROGESTERONE

In the manner described in Example 20(A), 4 g. of 6α-methyl-17α-bromoprogesterone (the compound of Example 35) is subjected to the action of a culture of the organism *Curvularia lunata* and the resultant product isolated and purified to give 6α-methyl-11β-hydroxy-17α-bromoprogesterone.

(B) 6α-METHYL-17α-BROMO-4,9(11)-PREGNADIENE-3,20-DIONE

Two grams of 6α-methyl-11β-hydroxy-17α-bromoprogesterone, prepared as described in Example 36(A), is refluxed for 30 minutes with a solution of 4 g. of dry lithium bromide in 50 ml. of glacial acetic acid. The solution is poured into water. A solid separates which is filtered, washed with water and crystallized from acetone-hexane to give 6α-methyl-17α-bromo-4,9(11)-pregnadiene-3,20-dione.

EXAMPLE 37

*6α-Fluoro-17α-Bromoprogesterone*

(A) 5α-HYDROXY-6β-FLUORO-17α-BROMOPREGNANE-3,20-DIONE

Five grams of 5α,6α-epoxy-17α-bromopregnane-3,20-dione 3,20-bisethylene ketal (the compound of Example 35(B)) is reacted with hydrofluoric acid in methylene chloride according to the procedure of Example 32(A). The resultant product is isolated in the described manner and crystallized from acetone-hexane to give 5α-hydroxy-6β-fluoro-17α-bromopregnane-3,20-dione.

(B) 6α-FLUORO-17α-BROMOPROGESTERONE

The 5α-hydroxy compound of Example 37(A) is dehydrated with thionyl chloride according to the procedure of Example 29(D). The resultant product is isolated in the described manner and crystallized from aqueous methanol to give 6α-fluoro-17α-bromoprogesterone.

EXAMPLE 38

*6α-Fluoro-17α-Bromo-4,9(11)-Pregnadiene-3,20-Dione*

(A) 6α-FLUORO-17α-BROMO-11β-HYDROXY-PROGESTERONE

Three grams of 6α-fluoro-17α-bromoprogesterone (the compound of Example 37) is subjected to the action of a culture of the organism *Curvularia lunata* according to the procedure of Example 20(A) and the resultant product isolated and purified to give 6α-fluoro-17α-bromo-11β-hydroxyprogresterone.

(B) 6α-FLUORO-17α-BROMO-4,9(11)-PREGNADIENE-3,20-DIONE

6α-fluoro-17α-bromo-11β - hydroxyprogesterone (the compound of Example 38(A)) is dehydrated with lithium bromide in glacial acetic acid in the manner described in Example 36(B). The resultant product is isolated in the described manner and crystallized from acetone-hexane to give 6α-fluoro-17α-bromo-4,9(11)-pregnadiene-3,20-dione.

EXAMPLE 39

*6α-Fluoro-9α,11β-Dichloro-17α-Bromoprogesterone*

One gram of 6α-fluoro-17α-bromo-4,9(11)-pregnadiene-3,20-dione (the compound of Example 38) is chlorinated with 340 mg. of N-chlorosuccinimide and 190 mg. of hydrogen chloride in the presence of lithium chloride in the manner described in Example 10(A). The resultant product is isolated in the described manner and crystallized from acetone-hexane to give 6α-fluoro-9α,11β-dichloro-17α-bromoprogesterone.

EXAMPLE 40

6α,11β-Difluoro-9α-Chloro-17α-Bromoprogesterone

One gram of 6α-fluoro-17α-bromo-4,9(11)-pregnadiene-3,20-dione (the compound of Example 38) is reacted with 340 mg. of chlorosuccinimide and 950 mg. of hydrogen fluoride in diethylacetic acid in the manner described in Example 11. The resultant product is isolated in the described manner and crystallized from acetone-hexane to give 6α,11β-difluoro-9α-chloro-17α-bromoprogesterone.

EXAMPLE 41

6α-Fluoro-9α,17α-Dibromo-11β-Chloroprogesterone 500 mg. of 6α-fluoro-17α-bromo-4,9(11)-pregnadiene-3,20-dione (the compound of Example 38) is reacted with 175 mg. of N-bromoacetamide and 100 mg. of hydrogen chloride in the presence of lithium chloride according to the procedure of Example 19. The resultant product is isolated in the described manner and crystallized from acetone-hexane to give 6α-fluoro-9α,17α-dibromo-11β-chloroprogesterone.

EXAMPLE 42

6α,17α-Dimethyl-1,4,9(11)-Pregnatriene-3,20-Dione

Five grams of 6α,17α-dimethyl-4,9(11)-pregnadiene-3,20-dione (the compound of Example 31) is fermented with Corynebacterium simplex (A.T.C.C. 6946) according to the procedure of U.S. Patent No. 2,837,464 as follows.

A 100 ml. broth culture containing a 0.1% yeast extract concentration, 9.0 ml. of 0.2 M $KH_2PO_4$ and 9.0 ml. of 0.2 M $Na_2HPO_4$, contained in a 300 ml. Erlenmeyer flask, is seeded with 1 ml. of a 24-hour broth culture of Corynebacterium simplex. The flask is incubated at 28° C. for 28 hours. A second 300 ml. of Erlenmeyer flask containing 150 mg. of sterile 6α,17α-dimethyl-4,9(11)-pregnadiene-3,20-dione in 5.0 ml. acetone is inoculated with the 24 hour culture of Corynebacterium simplex. The culture-containing steroid solution is incubated for 48 hours at 28° C. to 30° C.

After termination of the transformation period, the pH is 7.2–7.3. The culture is now directly extracted with 3 equal volumes of $CHCl_3$, the solvent volumes combined and concentrated on a steam bath to a residue which is crystallized from acetone-hexane to give 6α,17α-dimethyl-1,4,9(11)-pregnatriene-3,20-dione.

In similar manner, the compounds of Examples 7–9, 23 and 37 are subjected to the action of a culture of Corynebacterium simplex and the resultant products isolated and purified to give respectively, 6α-fluoro-17α-hydroxy-1,4,9(11)-pregnatriene-3,20-dione, 6α-fluoro-17α-hydroxy-1,4,9(11)-pregnatriene-3,20-dione 17-acetate, 6α-fluoro-17α-hydroxy-1,4,9(11)-pregnatriene-3,20-dione 17-caproate, 6β-fluoro-17α-hydroxy-1,4,9(11)-pregnatriene-3,20-dione 17-acetate, and 6α-fluoro-17α-bromo-1,4,9(11)-pregnatriene-3,20-dione.

In the above described manner, any of the 1,4,9(11)-pregnatrienes prepared as described in Example 42 may be chlorinated with chlorine gas in carbon tetrachloride in the presence of pyridine to give respectively, 6α-methyl-9α,11β-dichloro-17α-hydroxy-1,4-pregnadiene-3,20-dione, 6α-methyl-6α-fluoro-9α,11β-dichloro-17α-hydroxy-1,4-pregnadiene-3,20-dione, 6α-fluoro-9α,11β-dichloro-17α-hydroxy-1,4-pregnadiene-3,20-dione 17-acetate, 6α-fluoro-9α,11β-dichloro-17α-hydroxy-1,4-pregnadiene-3,20-dione 17-caproate, 6β-fluoro-9α,11β-dichloro-17α-hydroxy-1,4-pregnadiene-3,20-dione 17-acetate, and 6α-fluoro-9α,11β-dichloro-17α-bromo-1,4-pregnadiene-3,20-dione.

Similarly, any of the 1,4,9(11)-pregnatrienes prepared as described in Example 42 may be halogenated by any of the procedures described in the preceding examples to give the corresponding 9α,11β-dihalogenated-1,4-pregnadienes.

EXAMPLE 43

6α,11β-Difluoro-9α-Chloro-17α-Bromo-1,4-Pregnadiene-3,20-Dione

6α,11β-difluoro-9α-chloro-11β-bromoprogesterone (the compound of Example 40) is subjected to the action of a culture of the organism Corynebacterium simplex and the resultant product isolated in a manner similar to that described in Example 42 to give 6α,11β-difluoro-9α-chloro-17α-bromo-1,4-pregnadiene-3,20-dione.

In like manner, the dihalogenated progesterones of Examples 11–15, 25–28, and 39–41 are subjected to the action of the microorganism Corynebacterium simplex and the resultant products isolated and purified to give respectively, 6α-fluoro-9α,11β-dichloro-17α - hydroxy - 1,4 - pregnadiene - 3,20-dione 17-acetate, 6α,11β - difluoro - 9α - chloro - 17α - hydroxy - 1,4-pregnadiene-3,20-dione 17-acetate, 6α-fluoro-9α,11β-dichloro - 17α - hydroxy - 1,4 - pregnadiene - 3,20-dione 17 - caproate, 6α,11β - difluoro-9α-bromo-17α-hydroxy-1,4 - pregnadiene - 3,20 - dione 17-acetate, 6α - fluoro-9α-iodo - 11β - chloro - 17α-hydroxy-1,4-pregnadiene-3,20-dione 17 acetate, 6α-fluoro-9α,11β-dibromo-17α-hydroxy-1,4 - pregnadiene - 3,20 - dione 17 - acetate, 6β - fluoro-9α,11β - dichloro - 17α - hydroxy - 1,4-pregnadiene-3,20-dione 17 - acetate, 6β-fluoro-9α-bromo-11β-chloro-17α-hydroxy-1,4-pregnadiene-3,20-dione 17-acetate, 6β,11β-difluoro - 9α - iodo - 17α - hydroxy-1,4-pregnadiene-3,20-dione 17-acetate, 6α,11β - difluoro - 9α-iodo-17α-hydroxy-1,4 - pregnadiene - 3,20 - dione 17 - acetate, 6α - fluoro-9α,11β - dichloro - 17α - bromo - 1,4 - pregnadiene - 3,20-dione, 6α,11β - difluoro - 9α - chloro - 17α - bromo - 1,4-pregnadiene - 3,20 - dione, and 6α-fluoro-9α,17α-dibromo-11β-chloro-1,4-pregnadiene-3,20-dione.

We claim:

1. Compounds of the group consisting of 6-fluoro-9α-X-11β-Y-17α-R-progesterones, 6-fluoro-9α-X-11β-Y-17α-R-19-norprogesterones and 6-fluoro-9α-X-11β-Y-17α-R-1-dehydroprogesterones wherein X is a halogen having an atomic weight greater than 19; Y is a halogen having an atomic weight less than 126 and being at least as electronegative as X; and R is a member of the group consisting of bromine, hydroxy, and acyloxy radicals of hydrocarbon carboxylic acids containing up to 12 carbon atoms.

2. 9α - X - 11β - Y - 6α - fluoro-17α-bromoprogesterone wherein X is a halogen having an atomic weight greater than 19; and Y is a halogen having an atomic weight less than 126 and being at least as electronegative as X.

3. 9α - X-11β-Y-6α-fluoro-17α-bromo-1-dehydroprogesterone wherein X is a halogen having an atomic weight greater than 19; and Y is a halogen having an atomic weight less than 126 and being at least as electronegative as X.

4. 9α-X-11β-Y-17α-R-6-fluoroprogesterone wherein X is a halogen having an atomic weight greater than 19; Y is a halogen having an atomic weight less than 126 and being at least as electronegative as X; and R is an acyloxy radical of a hydrocarbon carboxylic acid containing up to 12 carbon atoms.

5. 9α - X-11β-Y-17α-R-6-fluoro-1-dehydroprogesterone wherein X is a halogen having an atomic weight greater than 19; Y is a halogen having an atomic weight less than 126 and being at least as electronegative as X; and R is an acyloxy radical of a hydrocarbon carboxylic acid containing up to 12 carbon atoms.

6. 9α - X - 11β - Y - 6 - fluoro-17α-hydroxyprogesterone wherein X is a halogen having an atomic weight greater than 19; and Y is a halogen having an atomic weight less than 126 and being at least as electronegative as X.

7. 9α - X - 11β-Y-6-fluoro-17α-hydroxy-1-dehydroprogesterone wherein X is a halogen having an atomic weight greater than 19; and Y is a halogen having an atomic weight less than 126 and being at least as electronegative as X.

8. 6α-fluoro-9α,11β-dichloro-17α-hydroxyprogesterone 17-acetate.

9. 6α-fluoro-9α,11β-dichloro-17α-hydroxyprogesterone 17-caproate.

10. 6α-fluoro-9α,11β-dichloro-17α-hydroxy-1-dehydroprogesterone 17-acetate.

11. 6α,11β-difluoro-9α-chloro-17α-hydroxyprogesterone 17-acetate.

12. 9α-X-11β-Y-17α-R-6-fluoro-19-norprogesterone wherein X is a halogen having an atomic weight greater than 19; Y is a halogen having an atomic weight less than 126 and being at least as electronegative as X; and R is an acyloxy radical of a hydrocarbon carboxylic acid containing up to 12 carbon atoms.

13. 17α-R-6α-fluoro-9α,11β-dichloroprogesterone wherein R is an acyloxy radical of a hydrocarbon carboxylic acid containing up to 12 carbon atoms.

14. 6α-fluoro-9α,11β-dichloro-17α-hydroxyprogesterone.

15. 6α-fluoro-9α,11β-dichloro-17α-hydroxy-1-dehydroprogesterone.

16. 6α-fluoro-9α,11β-dichloro-17α-hydroxy-19-norprogesterone 17-acetate.

17. 17α-R-6β-fluoro-9α,11β-dichloroprogesterone wherein R is an acyloxy radical of a hydrocarbon carboxylic acid containing up to 12 carbon atoms.

18. 6β-fluoro-9α,11β-dichloro-17α-hydroxyprogesterone.

19. 6β-fluoro-9α,11β-dichloro-17α-hydroxyprogesterone 17-acetate.

20. 6β-fluoro-9α,11β-dichloro-17α-hydroxy-1-dehydroprogesterone.

21. 6β-fluoro-9α,11β-dichloro-17α-hydroxy-19-norprogesterone 17-acetate.

22. 6α,11β-difluoro-9α-bromo-17α-hydroxyprogesterone 17-acetate.

23. A member of the group consisting of a compound of the formula:

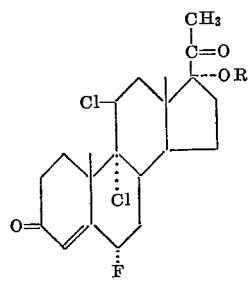

and the 1-dehydro derivatives thereof, wherein R is a hydrocarbon carboxylic acyl group of less than 12 carbon atoms.

24. A compound of the group consisting of 6-fluoro-17α-bromo-9(11)-dehydroprogesterone, 6-fluoro-17α-bromo-1,9(11)-bis-dehydroprogesterone, 6-fluoro-17α-bromo-9(11)-dehydro-19-nor-progesterone, 6-fluoro-17α-R-9(11)-dehydroprogesterone, 6-fluoro-17α-R-1,9(11)-bis-dehydroprogesterone and 6-fluoro-17α-R-9(11)-dehydro-19-nor-progesterone, wherein R is a member of the group consisting of H and lower alkanoyl.

References Cited in the file of this patent
UNITED STATES PATENTS

| | | |
|---|---|---|
| 2,838,536 | Magerlein et al. | June 10, 1958 |
| 2,838,542 | Spero et al. | June 10, 1958 |
| 2,880,205 | Campbell et al. | Mar. 31, 1959 |
| 2,894,963 | Gould et al. | July 14, 1959 |